(No Model.)
S. BERGMANN.
COMPOSITION COATING FOR PAPER TUBES.
No. 482,718. Patented Sept. 20, 1892.
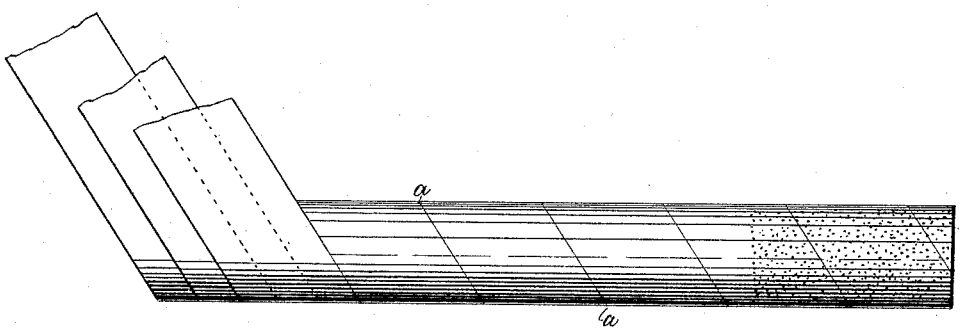
WITNESSES:
INVENTOR
BY HIS ATTY.

United States Patent Office.

SIGMUND BERGMANN, OF NEW YORK, N. Y., ASSIGNOR, BY MESNE ASSIGNMENTS, TO THE INTERIOR CONDUIT AND INSULATION COMPANY, OF SAME PLACE.

COMPOSITION COATING FOR PAPER TUBES.

SPECIFICATION forming part of Letters Patent No. 482,718, dated September 20, 1892.

Application filed March 4, 1891. Serial No. 383,704. (No specimens.)

*To all whom it may concern:*

Be it known that I, SIGMUND BERGMANN, of New York, in the county and State of New York, have invented a certain new and useful Improvement in Coatings for Paper Tubes, of which the following is a specification.

Tubes made of paper are commonly used as conduits for electric wires and are useful for many other purposes.

The object of my improvement is to render such tubes fireproof and alkali-proof.

My improvement consists in a coating for a paper tube or conduit, consisting of plumbago mixed with a solution of plaster-of-paris or equivalent adhesive substance.

The accompanying drawing is a side view of a tube partly coated in accordance with my improvement.

The tube which I have represented is composed of a number of strips of paper spirally wound upon a mandrel in such manner as to break joints. The joints *a* of one of the strips may be seen in the drawing. This tube is coated either inside or out, or both, and throughout any portion of its length with a mixture of plumbago and a solution of plaster-of-paris or equivalent adhesive substance. The plumbago will be ground into powder and mixed with the solution of plaster-of-paris or other adhesive substance. Afterward it may be applied by means of a brush or otherwise.

A tube coated in accordance with my invention will be practically acid, fire, and alkali proof, wherefore it is well adapted to be inserted in a wall. It is not inflammable, and, moreover, it is not a good conductor of heat.

What I claim as my invention, and desire to secure by Letters Patent, is—

A coating for a tube or conduit, consisting of a mixture of plumbago and plaster-of-paris, substantially as specified.

In testimony whereof I have signed my name to this specification in the presence of two subscribing witnesses.

SIGMUND BERGMANN.

Witnesses:
CLIFT WISE,
JAMES NAGLE.